United States Patent [19]
Kissinger et al.

[11] 3,940,608
[45] Feb. 24, 1976

[54] FIBER OPTIC DISPLACEMENT MEASURING APPARATUS

[75] Inventors: Curtis D. Kissinger, Gloversville, N.Y.; Bradford Howland, Cambridge, Mass.

[73] Assignee: Mechanical Technology Incorporated, Latham, N.Y.

[22] Filed: Feb. 4, 1974

[21] Appl. No.: 439,339

[52] U.S. Cl. .................. 250/227; 350/96 B; 356/4
[51] Int. Cl.² .......................................... G02B 5/16
[58] Field of Search .... 350/96 B, 214, 222, 175 TS; 250/227; 356/125, 156, 4

[56] References Cited
UNITED STATES PATENTS

| | | | |
|---|---|---|---|
| 3,305,689 | 2/1967 | Leavy et al. | 250/227 |
| 3,327,584 | 6/1967 | Kissinger | 350/96 B X |
| 3,497,701 | 2/1970 | Dalton | 250/227 X |
| 3,584,779 | 6/1971 | Kessler et al. | 250/227 X |
| 3,619,067 | 11/1971 | Howland et al. | 356/125 |
| 3,777,153 | 12/1973 | Anderson et al. | 250/227 |
| 3,788,741 | 1/1974 | Buechler | 356/4 |

Primary Examiner—David H. Rubin
Attorney, Agent, or Firm—Joseph V. Claeys

[57] ABSTRACT

Fiber optic displacement/position measuring apparatus having increased working distance and measuring range capability is provided by combining an optical extending sensing head in fixed relationship with the common end of a bifurcated fiber optic bundle. The sensing head includes a lens system which is operative to focus the image of the end face of the fiber optic bundle onto the surface of an object whose displacement is to be determined and to refocus that image back onto the end in an upright relationship.

11 Claims, 7 Drawing Figures

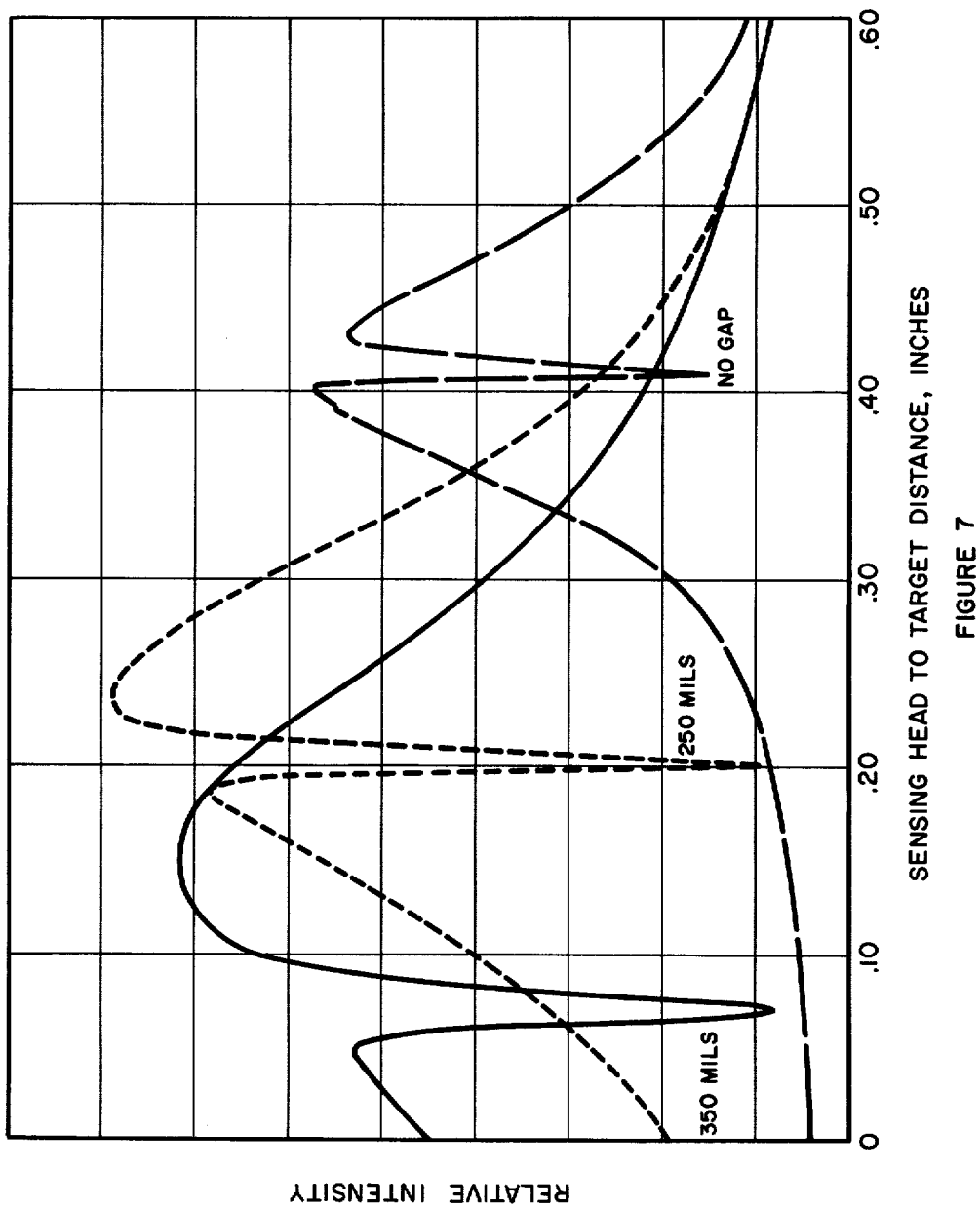

FIBER OPTIC DISPLACEMENT MEASURING APPARATUS

BACKGROUND OF THE INVENTION

This invention relates to electro-optic displacement measuring apparatus and systems and more particularly to new and improved fiber optic displacement measuring apparatus and systems having increased working distance and measuring range capability.

Fiber optic displacement devices utilizing bifurcated fiber optic bundles in combination with a light source and a photo detector, or other suitable light receiver, for measuring displacements are known in the prior art. A typical device is illustrated schematically in FIG. 1 and is described in U.S. Pat. No. 3,327,584 which is assigned to the assignee of the present invention. Such devices comprise a fiber optic bundle divided at one end into separate arms. One arm contains transmitting fibers and the other arm contains receiving fibers. The other or common end comprises a common bundle of transmitting and receiving fibers. When placed with face of the common end of the fiber optic bundle in close proximity to a target, light from the transmitting fibers impinges on the target and is reflected back to the receiving fibers where it is conducted to a photo sensor or other light receiver. The amount of reflected light is related to the distance between the end face of the fibers in the common bundle and the surface of the target, the diameter of the fibers, the numerical aperture of the fibers, the geometrical distribution of the transmit and receive fibers, the total number of fibers, and the reflectivity of the target surface. Thus, starting from the position of direct contact of the end face of the fiber optic bundle with the surface of the target as the gap between the bundle end and the target increases, greater amounts of light impinge on the receiving fibers in a substantially linear relationship to the displacement of the target. While such prior art arrangements are effective, they suffer from several undesirable limitations. For example, in order to achieve the maximum sensitivity and linearity possible, the working distance (i.e. the distance from the common end to the target) is restricted to the order of 1–5 mils. Greater working distances produce significantly reduced sensitivity and linearity while lesser working distances become difficult to achieve and maintain to the required tolerance. Another limitation is that the range of displacements measurable with a desired high accuracy is limited to about 1–3 mils. Yet another limitation of the prior art devices is that the target be at least as large as the common end of the fiber optic bundle.

SUMMARY OF THE INVENTION

It is an object of this invention to provide fiber optic displacement measuring apparatus capable of determining displacements at a very greatly increased working distance from the target. Operation at an increased working distance offers many advantages, such as for example greatly reduced possibility of the bundle end coming into direct contact with the target surface. This becomes extremely important in applications in which the target may be living tissue, such as for example the human eye, or when the target is a very delicate or sensitive material, such as semiconductor material.

It is another object of this invention to provide fiber optic displacement measuring apparatus having a range of measurement capability approximately double that of the known prior art devices and without any reduction in sensitivity and linearity.

It is further object of this invention to provide fiber optic displacement measuring apparatus capable of determining the displacement of targets which are smaller than the diameter of the common end of the fiber optic bundle enabling the use of a large fiber optic bundle with greater light level resulting in increased frequency response.

Briefly stated, in accordance with one aspect of this invention, apparatus for determining the displacement of an object comprises a fiber optic conduit of generally Y configuration having the end of one arm thereof positioned adjacent a light source and the end of the other arm thereof positioned adjacent a light receiving means for receiving transmitted light from the light source. The conduit arms form a common bundle of optically conducting fibers in the base of the Y. The apparatus also includes a sensing head, including a lens means, mounted in fixed relationship with the common bundle so that the end face of such common bundle is disposed adjacent one end of the lens means. The other end of the lens means terminates at the other end of the sensing head which is adapted for positioning adjacent an object whose displacement is to be determined. The lens means is operative to focus the image of the end face of the common bundle onto the object and refocus such image back onto such end face so that light transmitted from the fibers associated with the light source is returned upon itself. Displacement of the object causes defocussing of the image back on the end face so that more of the transmitted light is transmitted to the light receiving means to provide an output indicative of such displacement.

The novel features believed characteristic of this invention are set forth with particularity in the appended claims. The invention itself however, both as to its organization and method of operation together with further objects and advantages thereof, may best be understood by reference to the following description taken in conjunction with the accompanying drawing.

DESCRIPTION OF THE PREFERRED EMBODIMENTS

Figure 1:
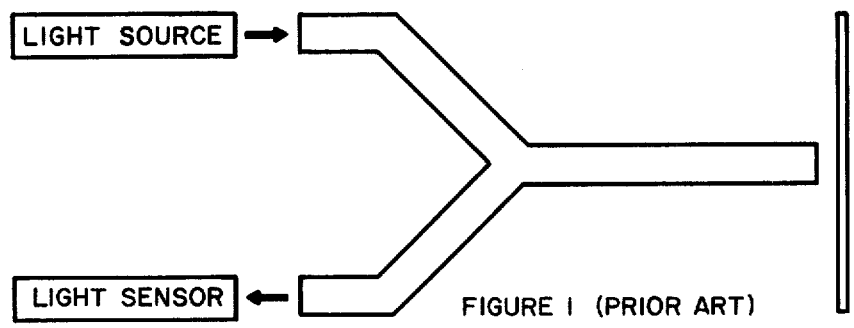
FIG. 1 is a schematic representation of a prior art fiber optic displacement measuring device.
Figure 2:
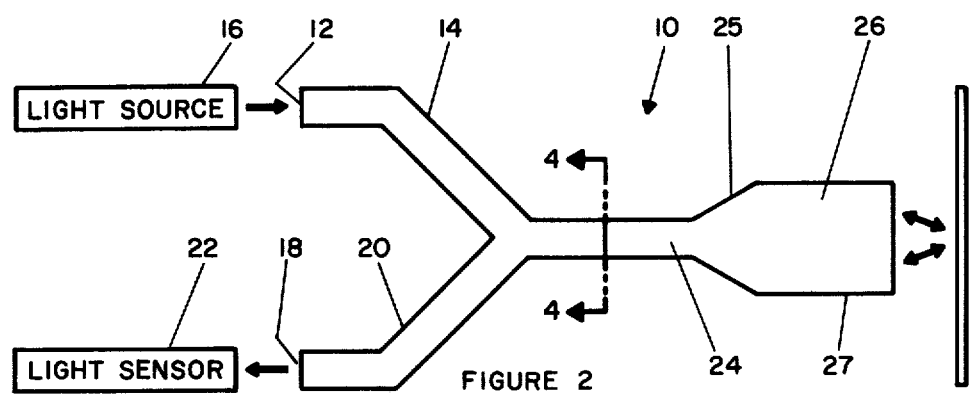
FIG. 2 is a schematic representation of one embodiment of the invention.

In FIG. 2 there is illustrated apparatus in accordance with one embodiment of the invention. As shown, the apparatus includes a glass fiber optic conduit 10 of generally Y configuration. The end face 12 of one arm 14 of fiber optic conduit 10 is positioned adjacent a suitable light source 16 and the end face 18 of the other conduit arm 20 is positioned adjacent a photo sensor or other suitable light receiver 22 for receiving light transmitted from light source 16. Conduit arms 14 and 20 form a common bundle 24 of optically conducting fibers in the base of the Y which is mounted to the end 25 of a sensing head 26, the other end 27 of which is adapted to be positioned adjacent the surface of an object whose displacement or position is to be determined. Sensing head 26 comprises a focusing lens means capable of focusing the end face of the common bundle 24 onto the surface of the object and causing such end face to be refocused back onto itself.

Figure 3:
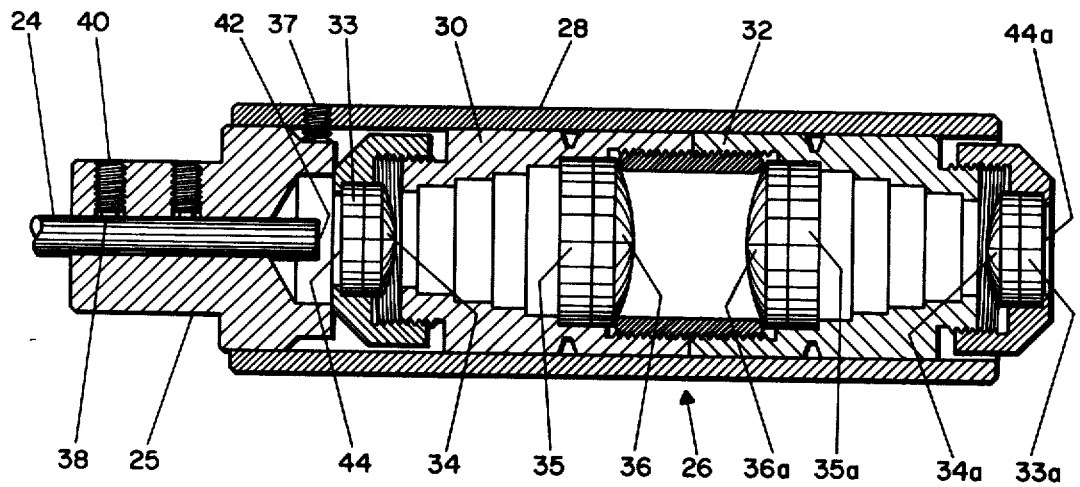
FIG. 3 is an enlarged section view of the sensing head 26 of FIG. 2.

As illustrated in detail in FIG. 3, sensing head 26 comprises a housing 28 containing a suitable focusing lens means. The lens means may include one or more lenses or lens systems. In the arrangement shown, the lens means comprises a pair of similar 4-element projection lenses 30 and 32 arranged in back-to-back relationship within the housing 28. Projection lens 30 includes the lens elements 33, 34, 35 and 36 while projection lens 32 includes the lens elements 33a, 34a, 35a and 36a. One end of the end 25 of sensing head 26 fits within the housing 28 and is conveniently removably secured thereto by the set-screws 37. The other end of the end 25 terminates in an opening 38 adapted to receive the common end of the fiber optic conduit 10. Conveniently, set-screws 40 may be provided to removably secure the end of the fiber optic conduit within the opening 38 so as to allow for removal of the fiber optic conduit from the sensing head, or the adjustment of the end face 42 of the fiber optic conduit with respect to the end surface 44 of the lens element 33. The end of the common bundle 24 of the fiber optic conduit 10 is preferably ground and polished optically flat and mounted so as to be centered and perpendicular to the optical axis of the lens means. While allowing for adjustment and/or removal, the setscrews 40 fixedly secure the end of the fiber optic conduit to the sensing head 26 so that during operation there will be no relative movement between the end face 42 of the fiber optic conduit and the end surface 44 of lens element 33. The end surface 44a of the lens element 33a terminates at the end 27 of sensing head 26.

Sensing head 26 may contain any suitable lens or lens system capable of focusing the end face 42 of common bundle 24 onto the surface of the object and refocusing such image back onto the end face 42, so that when the image is sharply focused on the object there will be a minimum amount of light received by the light receiver 22 and thus a minimum output from the displacement measuring apparatus. That is, when the image of end face 42 is sharply focused on the object and similarly sharply refocused back onto the end face 42, the light transmitted by the fibers associated with the light source 16 is returned upon itself and the fibers associated with light receiver 22 receive relatively little light.

Preferably, the lens means should have low aberrations, a wide aperture, and conjugate planes which match the planes of the system. Conveniently, a suitable lens system may be provided using a wide variety of commercially available lenses. For example, a suitable lens system may be provided from a pair of available relatively inexpensive projection lenses arranged back-to-back as illustrated in FIG. 3. A higher quality lens system may be provided from a pair of available conjugate microscope lenses of approximately the same linear aperture attached together at their flange screw mount ends. In one specfic apparatus a completely satisfactory lens system was provided using a pair of 8 mm, wide angle lenses having a 19 mm focal length and an aperature of f-1.6 arranged back-to-back as illustrated in FIG. 3. Such system focused the image on the surface of the object and refocused it back in a 1:1, upright relationship. Moreover, the apparatus exhibited high sensitivity response at a working distance 100 times larger than that possible with a prior art device. Replacing the projection lens 32 at the end 27 of the sensing head 26 with a 20X microscope lens (Unitron Type MPL-20X) provided a system with approximately a 3:1 reduction in the size of the image on the surface of the object.

Figure 4:
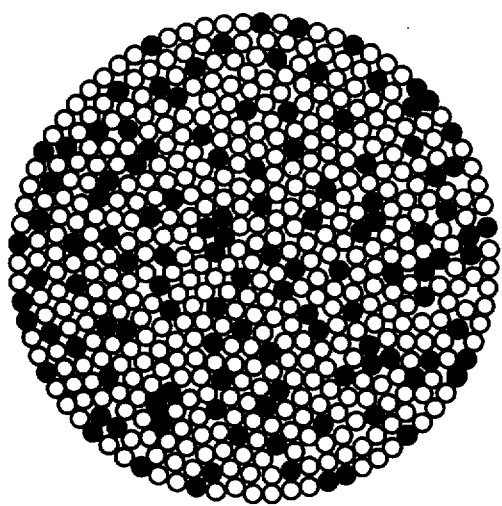
FIG. 4 is a greatly enlarged section view taken along the line 4—4 of FIG. 2 showing the distribution of the transmitting and receiving fibers of the common bundle.

In operation, the end 27 of sensing head 26 is disposed in proximity to an at least partially reflective target whose displacement is to be determined. The fibers of arm 14 are illuminated by light source 16 and form a pattern of lighted (transmitting) fibers interspersed with non-lighted (receiving) fibers as shown in FIG. 4. The image of the end face 42 of common bundle 24 is focused on the target by the lens means of sensing head 26 and refocused back onto the end face 42. The distance between the end 27 of sensing head 26 and the target is adjusted to give a sharply focused image of end face 42 on the target which is sharply refocused back onto the end face 38. This occurs when the end face 42 of common bundle 24 is positioned at one focal plane of the lens means and the target is at the conjugate focal plane thereof. However, as will become evident from an observation of the curves of FIG. 7, the particular position of the end face 42 with respect to the focal plane of the lens means is not particularly critical.

For simplicity in describing the mode of operation of the invention assume, for example, that end face 42 contains only a single transmit fiber and a single adjacent receive fiber. The image of the lighted transmit fiber is focused on the target by the lens means. The resulting image on the target is also refocused by the lens means back onto the end face 38 where it appears in focus superimposed on the transmit fiber from which it emanated, with little or none of the light therefrom impinging on the receive fiber adjacent thereto. Any displacement of the target, either toward or away from the end 27 of sensing head 26, defocuses the image reflected onto the end face 42. As a necessary result thereof, some of the light which originally emanated from the transmit impinges on the receive fiber adjacent thereto, and is detected as an increase in output of the light receiver 22.

Similarly, when the end face 42 of common bundle 24 contains a plurality of transmit and receive fibers arranged in a selected pattern, such as the random distribution illustrated in FIG. 4, this pattern is focused on the target, reflected thereby, and refocused on the end face 42 of common bundle 24. In a sharply focused condition, the image of the end 42 is superimposed on itself in a right side up relation. A minimum of light thus impinges upon the receive fibers. Any displacement of the target from this initial position results in increasing amounts of light impinging on the receive fibers, and a consequent increase in the output of the light receiver 22.

Preferably, the common bundle 24 should contain randomly dispersed transmit and receive fibers, although various distributions and sizes of transmit and receive fibers may be employed, as is well known to those skilled in the art. For example, random distribution of transmit and receive fibers, in equal proportion produces a fiber optic conduit having optimum sensitivity while maintaining ease of manufacture. It will be understood, however, that the particular type or size of fiber optic conduit or the distribution of the fibers in the fiber optic conduit are not part of this invention per se, nor is the specific type of light source or light receiver which may be utilized. All of such components are well known to those skilled in the art and are not described in detail in this specification. Thus, for example, the source of light may be a lamp, an electroluminescent diode, or other suitable device, and the light receiver may be a photo-electric cell, such as a cadmium sulphide photocell, or any other suitable device.

Figure 5:
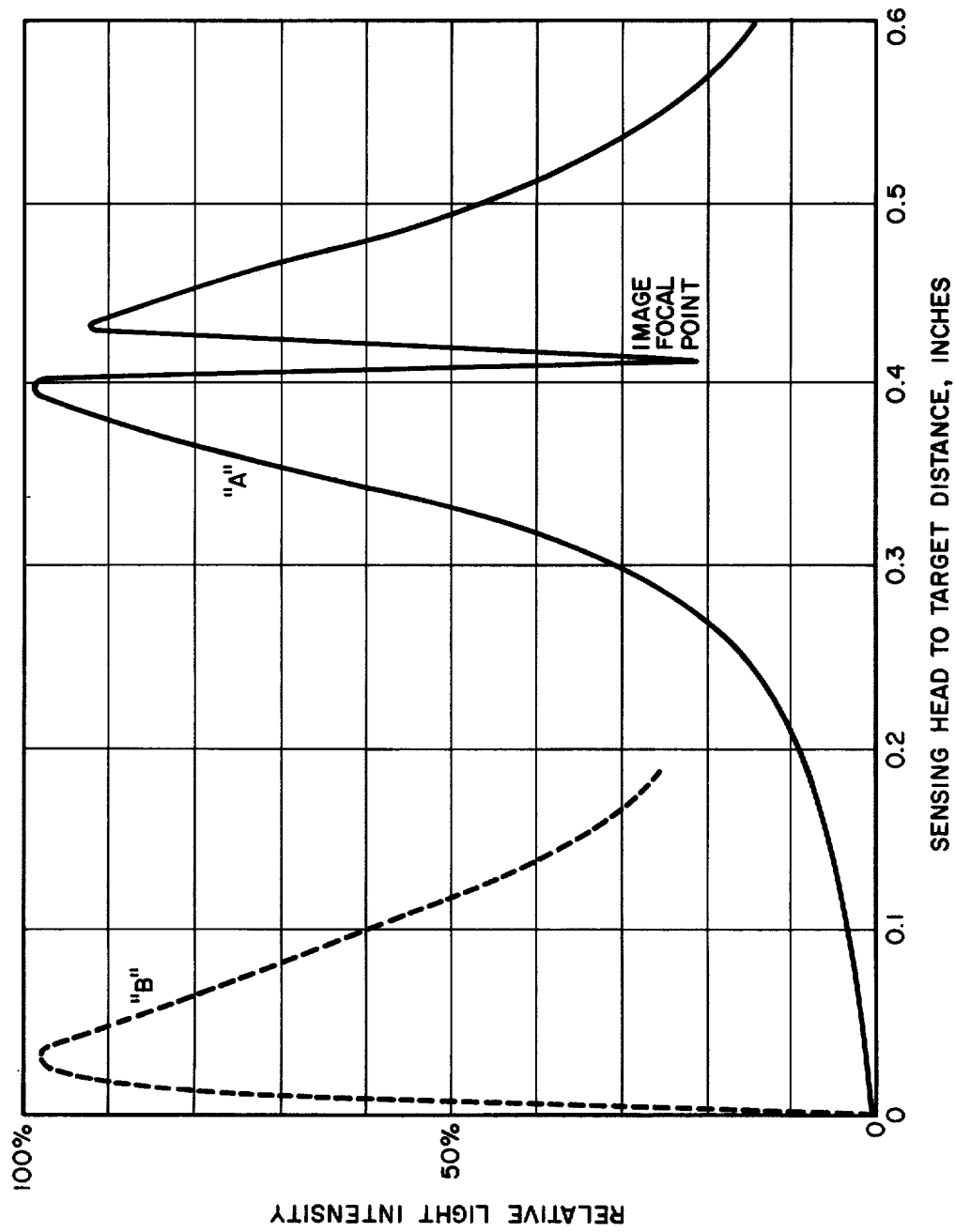
FIG. 5 is a graphical representation of the response of one embodiment of the invention showing in addition, for comparison, the response of a prior art apparatus.

In FIG. 5 there is shown an output Curve "A" of a displacement/position measuring device of the present invention and an output Curve "B" of a typical prior art device. In each case the fiber optic conduit contained approximately 600 glass fibers, each 0.003 inch in diameter. Also, there was a random distribution of transmit and receive fibers in the common bundle with an equal number of fibers in each of the arms. Further, so that relative variations in intensity with displacement could be observed directly, the output Curve "A" and "B" were normalized to the same peak valve.

An examination of FIG. 5 shows that Curve "A" has two intensity displacement portions which are nearly identical to the output Curve "B" of the prior art type device, except that one portion is reversed. This occurs since the bright fiber image on the target is retransmitted back through the lens means along the precise lines from which it came. That is, the ends of the illuminated (transmit) fibers are reimaged onto themselves (within the accuracy of the lens system employed and the surface finish of the target) and do not provide light to any of the adjacent receive fibers resulting in an output null at image focus. The right-hand portion of output Curve "A" is nearly identical to Curve "B" except that it occurs at a much greater standoff distance. Also, since on either side of the focal point the projected and retransmitted images are blurred allowing portions of the retransmitted light to fall onto receive fibers, a peak in output intensity occurs on either side of the null point in Curve "A".

From the foregoing description it will be understood that during the course of a measurement the distance between the end face 42 of common bundle 24 and the end surface 44 of lens element 33 must be kept constant. However, if a specific working distance is desired, a sharply focused condition may be obtained by varying the distance from the end face 42 to the end surface 44 of the lens element 33. Once this focused condition is obtained, the distance from the end surface 44 of lens element 33 to the end face 44 of common bundle 24 must remain fixed during the course of the measurement. Also, there are cases, such as when there are large changes in the distance between the target and the sensing head, for example, when it may be advantageous in making the measurement to vary the distance from the end face 42 to the end surface 44 of the lense element 33. In this way the new position of the target can be readily determined by appropriate measurement of the change in the distance between the end face 42 and the end surface 44 of lens element 33. Accordingly, the sensing head 26 may be adapted to provide for adjustable mounting of the end of common bundle 24. Thus, as shown in FIG. 3, the end 25 of sensing head 26 is provided with set-screws 40 to allow for desired adjustment of the gap between the end face 42 of common bundle 24 and the end surface 44 of lens element 33. The effect of different gap sizes on the output response of the measuring system of the invention is shown in FIG. 7. Also, since end 25 is removably secured to the housing 28 by the set-screws 37, fiber optic conduits of different sizes may be used with a given sensing head and lens means by merely changing the end 25 for one which is adapted to accommodate the desired larger conduit.

It is also often desirable to be able to provide calibrated changes in sensitivity with displacement. The present invention allows for changes in sensitivity by varying the aperture, of f-number of the lens means utilized. For example, since the depth of field of a lens system varies directly with the f-number, a larger aperture results in a reduced depth of field with a resulting greater sensitivity to changes in displacement. Compound lens systems are available with adjustable f-number click stops and such systems may be advantageously employed with this invention.

Figure 6:
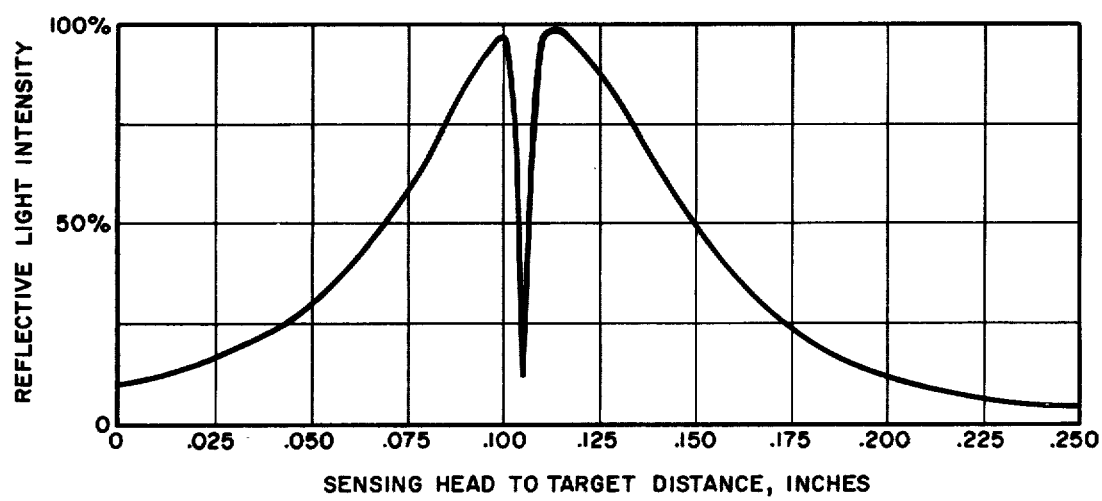
FIG. 6 is a graphical representation of the response of another embodiment of the invention; and, FIG. 7 is a graphical representation of the change in the response of an embodiment of the invention to changes in the gap between the end face of the common bundle portion of the fiber optic conduit and the end surface of the sensing head.

Also, as previously indicated, the image size of the focused sensing spot can be varied over a wide range by selection of appropriate lenses. FIG. 6 shows a calibration curve where the lens means provided for approximately a 5:2 reduction in image size on the surface of the target. This resulted in an image diameter of 0.035 in. when using a fiber optic conduit 0.086 in. in diameter. It will be observed that the null, or focal point has moved closer to the end of the sensing head and the displacement sensitivity increased approximately five times over the 1:1 system represented by Curve "A" in FIG. 4. This is a result of the reduced depth of field of the lens means plus the smaller effective diameter of the image of the individual fibers appearing on the reflective surface of the object.

While only preferred features of the invention have been shown and described by way of illustration, many modifications and changes will occur to those skilled in the art. It is, therefore, to be understood that the appended claims are intended to cover all such modifications and changes as fall within the true spirit and scope of the invention.

What we claim and desire to secure by Letters Patent of the United States is:

1. Optical apparatus for determining the displacement or position of an object comprising:
   a. A light source and a light receiver for receiving light transmitted from said light source;
   b. A fiber optic conduit of Y-shaped configuration having the end of one arm thereof positioned adjacent said light source and the other arm positioned adjacent said light receiver, said conduit arms forming a common bundle of optically conducting fibers in the base of said Y, some of which fibers are transmitting fibers for conducting light from said light source to a surface of said object and some of which are receiving fibers for conducting light reflected from the surface of said object to said light receiver so that said conduit is normally operative to conduct light from said light source and to conduct reflected light impinging on the end face of said common bundle to said light receiver; and c. A sensing head having one end thereof fixedly mounted with the end of said common bundle and the other end adapted to be positioned adjacent the surface whose displacement or position is to be measured, said sensing head including lens means comprising a pair of projection lenses arranged in back-to-back relationship and operative to focus the image of the end face of said common bundle onto the surface of said object and refocus said image back onto said end face to provide for a minimum output from said light receiver for a given distance between said end of said sensing head and the surface of said object and an increase in output from said light receiver for any change in said given distance.

2. The optical apparatus recited in claim 1 wherein the optically conducting transmitting and receiving fibers of the common bundle are randomly dispersed.

3. The optical apparatus recited in claim 1 wherein said lens means includes means for changing the magnification ratio.

4. The optical apparatus recited in claim 3 wherein each of said lenses is a microscope type lens.

5. The optical apparatus recited in claim 3 wherein said means for changing the magnification ratio of said lens means comprises substitution of one of the lenses of said pair.

6. The optical apparatus recited in claim 1 wherein said sensing head includes means for adjusting the distance between the end face of the common bundle and the lens means.

7. The optical apparatus recited in claim 1 wherein said lens means includes means for varying the aperture thereof.

8. In an optical apparatus for determining the displacement or position of an object having a fiber optic proximitor of the type comprising a fiber optic conduit of Y-shaped configuration having the end of one arm thereof positioned adjacent a light source, the end of the other arm positioned adjacent a light receiver and wherein the arms form a common bundle of optically conducting fibers in the base of the Y terminating in an end face which includes the ends of transmitting fibers for conducting light from said light source to a surface of said object and the ends of receiving fibers for conducting light reflected from the surface of said object to said light receiver so that light transmitted from the light source and reflected from the surface of an object normally impinges on said end face so as to be received by said light receiver and provide for an output therefrom; the improvement which comprises:

a. An optical extending sensing head having one end thereof mounted to the end of said common bundle and the other end adapted to be positioned adjacent the surface of an object whose displacement is to be determined, said sensing head including lens means comprising a pair of projection lenses arranged in back-to-back relationship and operative to focus the image of the end face of said common bundle onto the surface of said object and refocus said image back onto said end face to provide for a minimum output from said light receiver for a given distance between said end of said sensing head and the surface of said object and an increase in output from said light receiver for any change in said given distance.

9. The optical apparatus recited in claim 1 wherein said lens means is operative to focus the image of the end face of said common bundle onto the surface of said object in a 1:1 relationship.

10. The optical apparatus recited in claim 1 wherein said lens means is operative to focus the image of the end face of said common bundle onto the surface of said object in greater than a 1:1 relationship.

11. The optical apparatus recited in claim 1 wherein said lens means is operative to focus the image of the end face of the common bundle onto the surface of said object in less than a 1:1 relationship.

* * * * *